United States Patent
Anderson et al.

(10) Patent No.: US 8,713,086 B2
(45) Date of Patent: Apr. 29, 2014

(54) THREE-TERM PREDICTIVE ADDER AND/OR SUBTRACTER

(75) Inventors: Timothy D. Anderson, Dallas, TX (US); Mujibur Rahman, Plano, TX (US); Kai Chirca, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 445 days.

(21) Appl. No.: 13/178,508

(22) Filed: Jul. 8, 2011

(65) Prior Publication Data

US 2013/0013656 A1   Jan. 10, 2013

Related U.S. Application Data

(60) Provisional application No. 61/371,365, filed on Aug. 6, 2010.

(51) Int. Cl.
*G06F 7/50* (2006.01)

(52) U.S. Cl.
USPC .......................................... 708/700; 708/709

(58) Field of Classification Search
USPC .................................................. 708/700–714
See application file for complete search history.

(56) References Cited

U.S. PATENT DOCUMENTS

| | | | | |
|---|---|---|---|---|
| 5,267,187 A | * | 11/1993 | Hsieh et al. | 708/700 |
| 5,835,394 A | * | 11/1998 | Wong | 708/670 |
| 6,466,960 B1 | * | 10/2002 | Winters | 708/671 |
| 2006/0059222 A1 | * | 3/2006 | Dewan | 708/700 |

* cited by examiner

*Primary Examiner* — Tan V. Mai
(74) *Attorney, Agent, or Firm* — Robert D. Marshall, Jr.; W. James Brady; Frederick J. Telecky, Jr.

(57) ABSTRACT

A predictive adder produces the result of incrementing and/or decrementing a sum of A and B by a one-bit constant of the form of the form $2^k$, where k is a bit position at which the sum is to be incremented or decremented. The predictive adder predicts the ripple portion of bits in the potential sum of the first operand A and the second operand B that would be toggled by incrementing or decrementing the sum A+B by the one-bit constant to generate and indication of the ripple portion of bits in the potential sum. The predictive adder uses the indication of the ripple portion of bits in the potential sum and the carry output generated by evaluating A+B to produce the results of at least one of $A+B+2^k$ and $A+B-2^k$.

16 Claims, 7 Drawing Sheets

THREE-TERM PREDICTIVE ADDER AND/OR SUBTRACTER

CLAIM OF PRIORITY

This application for patent claims priority to U.S. Provisional Application No. 61/371,365 entitled "CIRCUIT WHICH OUTPUTS BOTH A+B AND A+B+/−2K USING SINGLE ADDER" filed Aug. 6, 2010, wherein the application listed above is incorporated by reference herein.

BACKGROUND

In computer architecture applications, it is often necessary to compute the sum of two N-bit numbers while also adding or subtracting a $2^k$ constant (where k<N) to or from the recently computed sum of the same two N-bit numbers. This situation often arises more specifically in memory address calculation during load and store operations, where memory calculations such as A+B, A+B+8 and A+B−8 are performed (where, e.g., k=3, and thus, $2^3$=8). Because the speed of memory accesses often limits the speed of a computer, the speed of the computation of these calculations is typically a primary speed limitation of computer processing units (CPUs). Conventional approaches used to calculate A+B, A+B+$2^k$ and A+B−$2^k$ are often either slow due to serially producing the results or relatively large (and power consuming) by duplicating adder hardware.

SUMMARY

The problems noted above are solved in large by predicting the effect of incrementing and/or decrementing a sum of A and B at a $k^{th}$ bit position. As disclosed herein, a predictive adder produces the result of incrementing and/or decrementing a sum of A and B by a one-bit constant of the form $2^k$, where k is a bit position at which the sum is to be incremented or decremented. The predictive adder predicts the ripple portion of bits in the potential sum of the first operand A and the second operand B that would be toggled by incrementing or decrementing the sum A+B by the one-bit constant to generate an indication of the ripple portion of bits in the potential sum. The predictive adder uses the indication of the ripple portion of bits in the potential sum and the carry output generated by evaluating A+B to produce the results of at least one of A+B+$2^k$ and A+B−$2^k$.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, the term "adder" and the like can include, depending on the immediate context of the text, devices that perform subtraction, such as an adder that is capable of evaluating the expression A+B−C. Also as shown in the Figures and accompanying Description, a single gate that is coupled to a bus (which includes one or more signals) represents all instances of the gates that are coupled to each signal of the bus.

Figures 1, 2:
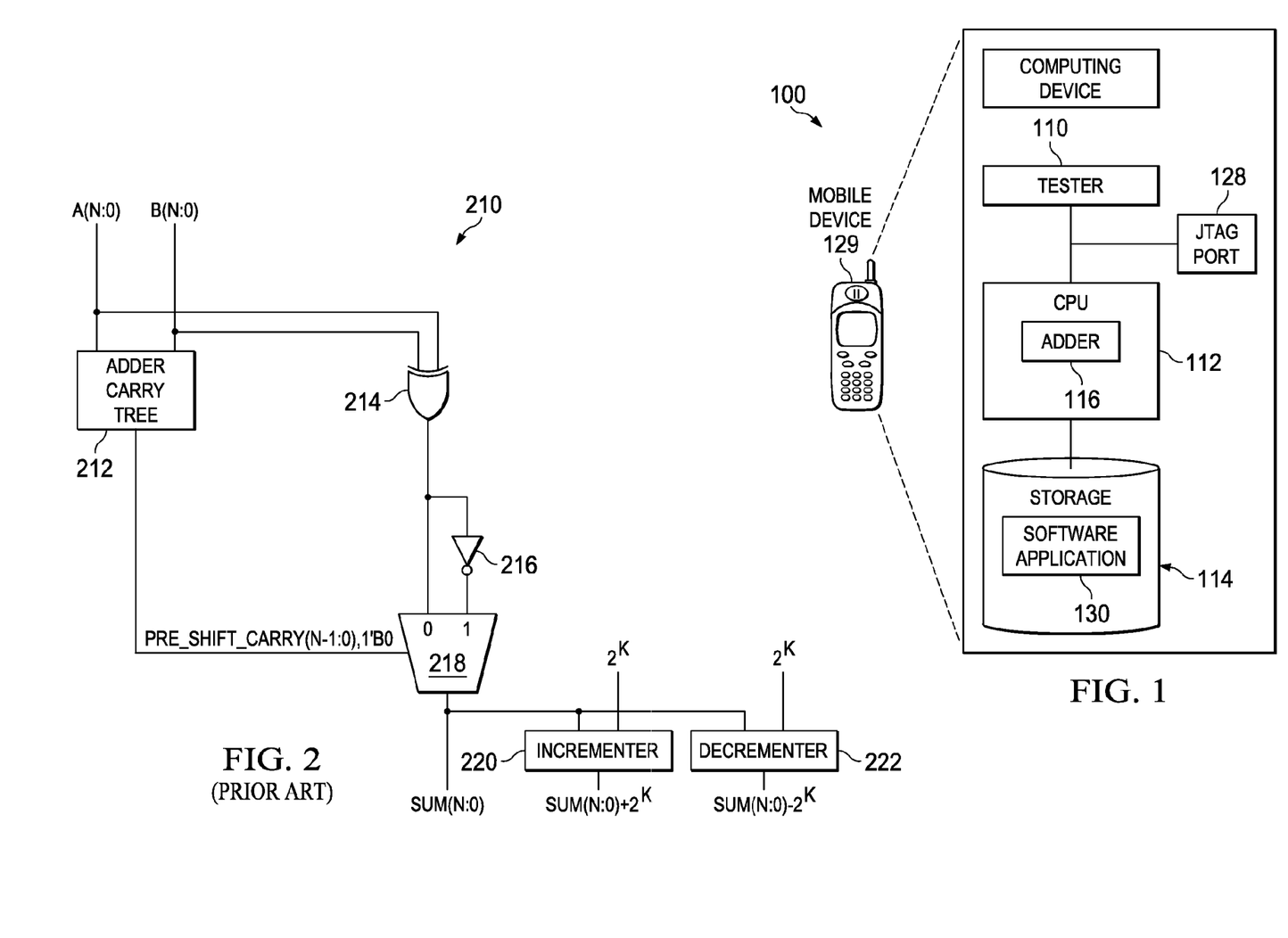
FIG. 1 shows an illustrative computing device 100 in accordance with embodiments of the disclosure.
FIG. 2 is a schematic diagram illustrating a conventional adder with an incrementer and decrementer.

FIG. 1 shows an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as RAM, flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s)

would interact with the software application 130). In this way, the software application 130 can be debugged in an environment which resembles post-production operation.

The CPU 112 typically comprises memory and logic which store information frequently accessed from the storage 114. Various subsystems (such as the CPU 112 and the storage 114) of the computing device 100 include one or more adders 116, which are used to perform memory calculations during the execution of the software application 130.

Conventional design methodologies are limited with regards to providing optimal solutions for computing the sum of two N-bit numbers while also adding or subtracting a $2^k$ constant (where k<N) to or from the recently computed sum of the same two N-bit numbers. This situation often arises in the context of memory address calculation during load and store operations. Because the speed of memory accesses often limits the speed of a computer, the speed of the computation of these calculations is typically a primary speed limitation of computer processing units (CPUs).

Two conventional approaches used to calculate A+B, A+B+$2^k$ and A+B−$2^k$. Serially producing the results is relatively slow because of relatively long path of signal propagation. Duplicating adder hardware minimizes processing delays but also results in larger design "footprints" and attendant higher power consumption. Providing optimal solutions for minimizing the delays while providing a compact and power efficient design is difficult because the signal propagation delays of many of the terms that need to be calculated before producing a final result.

Disclosed herein are techniques for minimizing the amount of delay of such three-term adder/subtracters. The disclosed three-term predictive adder/subtracter (such as adder 116) minimizes signal propagation paths and layout and power requirements. The disclosed three-term predictive adder/subtracter uses a predictive circuit to provide information used in the address calculation at points earlier in conventional calculation approaches, which are now discussed.

FIG. 2 is a schematic diagram illustrating a conventional adder with an incrementer and decrementer. An incrementer is a special adder that increments a value (or a range of bits in a value) by exactly one. Likewise a decrementer is a special subtracter that decrements a value (or a range of bits in a value) by exactly one. (Some embodiments of subtracters contain adders or portions of adders.) Adder 210 includes adder carry tree 212, exclusive OR (XOR) gate 214, inverter 216, multiplexer (MUX) 218, incrementer 220 and decrementer 222. Adder carry tree 212, XOR gate 214, inverter 216, and multiplexer (MUX) 218 are arranged as a three term adder having input A, input B, and Carry (A, B). Adder carry tree 212 generates all carries of Carry (A, B) for different bit positions of an input word.

Mathematically, the sum of A and B can be written as: Sum=A XOR B XOR Carry (A, B). Thus, XOR gate 214 produces a first partial result (A XOR B), with the adder carry tree 212, inverter 216, and MUX 218 arranged to efficiently produce the final sum by performing an exclusive OR function using the first partial result and an output of the adder carry tree 212 as inputs.

Adder 210 provides the final sum as inputs to incrementer 220 and decrementer 222 to produce A+B+$2^k$ and A+B−$2^k$ respectively. Thus, adder 210 can be very slow because the length of time to increment and/or decrement depends firstly on determining a final sum. However adder 210 requires less area and power than adder 300, discussed below with reference to FIG. 3.

Figure 3:
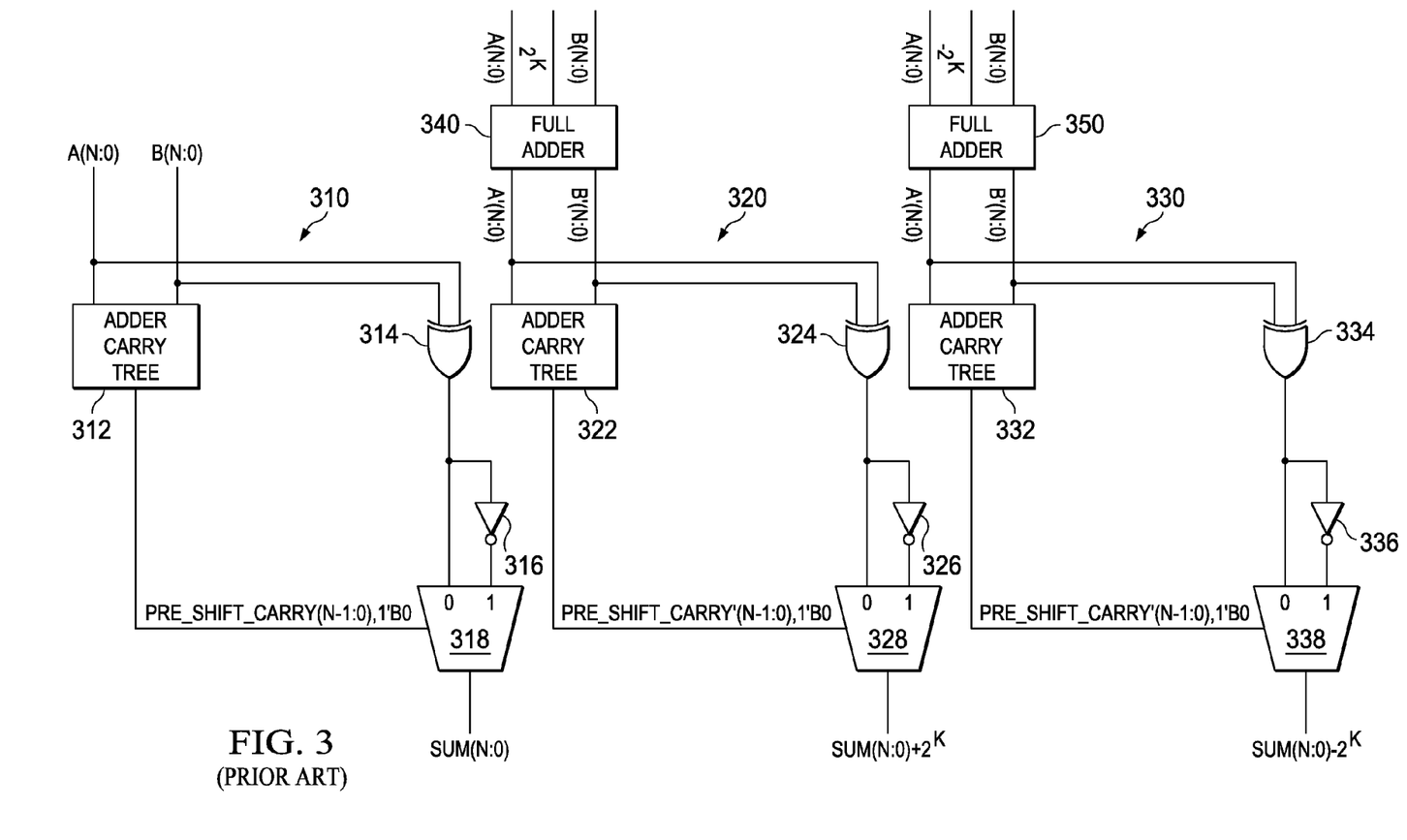
FIG. 3 is a schematic diagram illustrating three parallel conventional adders.

FIG. 3 is a schematic diagram illustrating three parallel conventional adders. Adder 310 is a two-input, one-output (2:1) full adder that includes adder carry tree 312, XOR gate 314, inverter 316, and multiplexer 318. Adder 320 is a two-input, one-output (2:1) full adder that includes adder carry tree 322, XOR gate 324, inverter 326, and multiplexer 328. The inputs of adder 320 coupled to the outputs of carry save adder 340, which is a three-input, two-output (3:2) adder that is arranged to add three numbers A, B and C to produce two numbers in carry save format. Adder 330 is a two-input, one-output (2:1) full adder that includes adder carry tree 332, XOR gate 334, inverter 336, and multiplexer 338. The inputs of adder 330 coupled to the outputs of carry save adder 350, which is a three-input, two-output (3:2) adder.

Thus, adder 310 is arranged to produce the sum of A and B. The coupling of adder 320 with adder 340 is arranged to adds three numbers A, B and +$2^k$ and to produce A+B+$2^k$. The coupling of adder 330 with adder 350 is arranged to adds three numbers A, B and −$2^k$ to produce A+B−$2^k$. The combination of adders 310, 320, and 330 is typically faster than adder 210, but consumes more layout area and power due to the multiple adders used to increment or decrement the sum of A+B by the $2^k$ constant.

Figure 4:
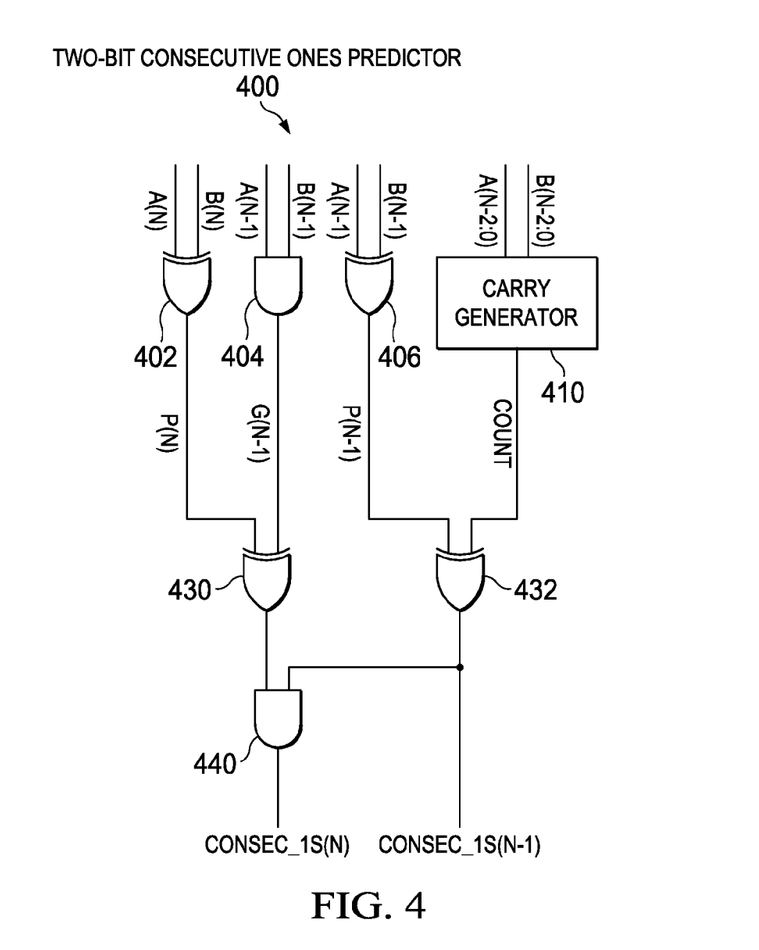
FIG. 4 is a schematic diagram illustrating a two-bit consecutive ones predictor for a predictive adder in accordance with embodiments of the disclosure.

FIG. 4 is a schematic diagram illustrating a two-bit consecutive ones predictor for a predictive adder in accordance with embodiments of the disclosure. Two-bit consecutive ones predictor 400 detects up to a sequence of two consecutive bits that are ones to "pre-calculate" the effect of adding a $2^k$ constant to the sum of the A+B (without having to produce the final sum before determining the effect of adding the $2^k$ constant). As described below with reference to FIG. 9, the prediction is calculated in parallel to the addition of A and B, and the pre-calculated result of the prediction is combined with the output of the carry tree of the A+B adder to produce A+B+$2^k$ as well as A+B−$2^k$. Thus, in accordance with the present disclosure, a single adder used to calculate all three results without increasing propagation delays over a single adder used to calculate the sum of A+B.

The principle of using consecutive bits that are ones to predict the effect of adding a $2^k$ constant to an arbitrary operand is now discussed using an example. When adding or subtracting a number of the form $2^k$ to a two's complement number, all consecutive bits (consecutive ones for addition and/or consecutive zeros for subtraction) are inverted starting from bit k and progressing towards more significant bits. All consecutive bits are inverted, and then one more (further significant) bit after that is inverted as well. For an example in addition, a first operand (a $2^k$ constant) is $2^k$=1000b which is the decimal number 8 represented in binary and the second operand is S, where S=0011010011111000b which is 13560 in decimal notation. Starting from the fourth bit (where bit number 0 is the first bit) a string of ones is encountered that is five bits long. The string of ones is inverted, as well as the next successively higher bit, which is inverted from a zero. Thus, S+1000b is represented as follows:

S+1000b=0011010100000000b

Converting the result of S+1000b (which is 0011010100000000b) into decimal notation yields 13568, which is a value that is exactly 8 greater than the original value of S (which is 13560).

For an example in subtraction, a first operand (a $2^k$ constant) is $2^k$=1000b is to be subtracted from the second operand S, where S=0011010100000000b which is 13568 in decimal notation. Starting from the fourth bit (where bit number 0 is the first bit) a string of zeros is encountered that is five bits long. The string of zeros is inverted, as well as the next successively higher bit, which is inverted from a one to a zero. Thus, S−1000b is represented as follows:

S−1000b=0011010011111000b

Converting the result of S−1000b (which is 0011010011111000b) into decimal notation yields 13560, which is a value that is exactly 8 lower than the original value of S (which is 13568).

The two-bit consecutive ones predictor 400 (as well as other predictors disclosed below) uses an algebraic manipulation to determine (e.g., to predict) where consecutive ones and zeros would be present in the final sum of A+B by evaluating the operands A(N:0) and B(N:0) from bit location k without beforehand producing the final sum of A+B. The prediction allows a substantial portion of the calculation of the addition of the constant in the form of $2^k$ to be performed in parallel with the calculations used to determine A+B. The parallel calculations do not lengthen propagation delay time beyond the time used to determine A+B, nor do they require two additional (conventional) full adders. The prediction calculations proceed more quickly than calculation of a final level of carry calculation in a carry save adder so that the results of the A+B+$2^k$ and A+B−$2^k$ calculations are available at the substantially same time as the results of the A+B calculations (see, FIG. 9, for example).

Generally, the algebraic manipulation uses the principle of consecutive ones in addition (and consecutive zeros in subtraction). The addition of a constant ($2^k$) is implemented as an incrementing function. The two-bit consecutive ones predictor 400 detects a consecutive sequence of ones (two, here, for simplicity) by evaluating two bits each of A and B (without adding A and B together) to determine the number of bits ("ripple portion") that are predicted to be toggled by incrementing the potential sum of A+B starting at a bit position determined by k.

More particularly, a derivation of the algebraic manipulation is now described. As shown above for adder 210, the sum of A and B can be described as $$S = A \text{ XOR } B \text{ XOR carry }(A,B) \tag{1}$$

The function for incrementing based on consecutive ones can be described as $$S+2^k = S \text{ XOR (consecutive ones }(S,K)<<1|1) \tag{2}$$

where consecutive ones (S,K) is a string of consecutive ones starting at bit position K to be left-shifted by one bit with the vacant bit position assigned a value of one.

Combining equations 1 and 2 above yields $$S+2^k = A \text{ XOR } B \text{ XOR carry }(A,B) \text{ XOR (consecutive 1's }(S,K)<<1|1) \tag{3}$$

Using the associative property of XOR, equation 3 is expressed as $$S+2^k = [A \text{ XOR } B \text{ XOR (consecutive ones }(S,K)<<1|1)] \text{ XOR carry }(A,B) \tag{4}$$

Using a similar derivation, the difference S−$2^k$ can be expressed as $$S-2^k = [A \text{ XOR } B \text{ XOR (consecutive zeros }(S,K)<<1|1)] \text{ XOR carry }(A,B) \tag{5}$$

The inputs to carry ripple portion of an adder at bit position N can be represented by propagate, generate, and "kill" (carry bit) variables used by two-bit consecutive ones predictor 400 to predict the carry ripple portion of the sum of A+B. The propagate variable P(N) is true when bitwise adding 1+0 or 0+1 (e.g., an XOR function): when the propagate variable P(N) is true, the carry out variable for bit N is the carry in variable for bit N−1, such that Cout(N)=Cin(N−1). The generate variable G(N) is true when bitwise adding 1+1 (e.g., an AND function): when the generate variable G(N) is true, the carry out variable for bit N is one, such that Cout(N)=1. The kill variable K(N) is true when bitwise adding 0+0 (e.g., an NOR function): when the kill variable K(N) is true, the carry out variable for bit N is zero, such that Cout(N)=0. Bitwise logical operations are typically implemented by performing a logical operation between a range of bits of a first operand and a range of bits of a second operands where pairs of corresponding bits between the two operands are successively (or in parallel) logically operated upon in pairs.

The sum at bit position N can be written as Sum (N)=P(N) XOR Cout(N−1). If P(N−1) is false, then Cout(N−1) is known and thus Sum(N) can be determined with certainty. If P(N−1) is true, then Cout(N−1) is not known and thus Sum (N) is not known. However, if P(N) is also true, then Sum(N)=Sum(N−1); when P(N) is false, then Sum(N)=NOT(Sum (N−1)). Table 1 list the above four possibilities for determining the value of Sum (N), using the values for the generate (G), propagate (P), and kill (K) variables that are determined in response to the logic states of A and B (which are enumerated in each column of G, P, and K variables in Table 1):

TABLE 1

| (N) | | | (N − 1) | | | |
|---|---|---|---|---|---|---|
| G (1 + 1) | P (1 + 0, 0 + 1) | K (0 + 0) | G (1 + 1) | P (1 + 0, 0 + 1) | K (0 + 0) | Sum(N) |
| 0 | 1 | 0 | 1 | 0 | 0 | 0 |
| X | 0 | X | 0 | 0 | 1 | |
| 0 | 1 | 0 | 0 | 0 | 1 | 1 |
| X | 0 | X | 1 | 0 | 0 | |
| 0 | 1 | 0 | 0 | 1 | 0 | Sum(N − 1) |
| X | 0 | X | 0 | 1 | 0 | NOT(Sum (N − 1)) |

Using the identities expressed in Table 1, the equations used to describe the two-bit consecutive ones predictor 400 (used in producing the sum of A+B+$2^k$) are now discussed. To add $2^k$ to the sum of A and B, the two-bit consecutive ones predictor 400 predicts whether Sum (N) and Sum (N−1) both have the value of one (e.g., "consecutive" ones, because N and N−1 are consecutive).

According to Table 1, there are three possibilities (listed as consecutive rows) in which consecutive ones exist. The first row for Sum(N)=1 indicates P(N)=1 and K(N−1)=1 when Sum(N)=1. Likewise, the second row for Sum(N)=1 indicates P(N)=0 and G(N−1)=1 when Sum(N)=1. Further, the row for Sum(N−1) indicates that P(N)=1 and P(N−1)=1 when Sum (N)=Sum(N−1). Thus, the three possibilities for a pair of consecutive ones (PCO) can be expressed as:

$$PCO=(P(N) \text{ AND } K(N-1)) \text{ OR } (NOT(P(N)) \text{ AND } G(N-1)) \text{ OR } (P(N) \text{ AND } P(N-1)) \tag{6}$$

Using the associative property of the AND operation:

$$PCO=(P(N) \text{ AND } (K(N-1) \text{ OR } P(N-1))) \text{ OR } (NOT(P (N)) \text{ AND } G(N-1))$$

Substituting NOT(G(N−1)) for (K(N−1) OR P(N−1)) because NOT(G)=K OR P:

PCO=(P(N) AND NOT(G(N−1))) OR (NOT(P(N)) AND G(N−1))

Using the identity for an XOR operation:

PCO=(P(N) XOR G(N−1))    (7)

Accordingly, XOR gate 402 generates the term P(N) and AND gate 404 generates the term G(N−1), which are then input to XOR gate 430 (per equation 7) to predict a pair of consecutive ones for Sum (N) and Sum (N−1).

The pair of consecutive ones for Sum (N) and Sum (N−1) also depends upon the term P(N−1) and the presence of a carry being generated from the bits of lesser order than N (e.g., less than the bit position implicated by $2^k$). Carry generator 410 generates the carry output based on each of the lesser inputs, which here extend downwards from the N−2 bit down to the zero bit (N−2:0) for both A and B operands. Thus the logic equation for carry generator 410 is relatively shallow (in terms of cascaded gates) and thus quickly produces the (final) carry output for N−2 based on the values of the lower bits (the carry out for each and every pair of the lower order bits need not be produced). The output COUT of carry generator 410 and the output P(N−1) of XOR gate 406 are provided as inputs to XOR gate 432 to predict a predict a possibility of either, but not both, a propagate bit for Sum (N−1) being generated or a carry out of lesser order bits being generated.

Thus, an indication of consecutive ones at the (up to) bit N position of Sum (N) is determined by AND gate 440. As disclosed herein, two-bit consecutive ones predictor 400 evaluates overlapping pairs of corresponding bits in operands A and B to determine propagate bits (e.g., P(N)) and a generate bit for an adjacent, lower bit (G(N−1)). The terms P(N) and G(N−1) are XORed (XOR gate 430) to produce the pair of consecutive ones (at bit position N). The pair of consecutive ones at bit position N signal is then ANDed (AND gate 440) with pair of consecutive ones of at least one bit position lower than N signal to generate the indication of consecutive ones at bit position N. Thus, the indication of consecutive ones is generated from evaluating overlapping pairs of corresponding bits in each successively lower bit positions (as further illustrated below with reference to FIG. 5, for example) of each operand to produce the (progressive) indication of consecutive ones in the ripple portion.

Figure 5:
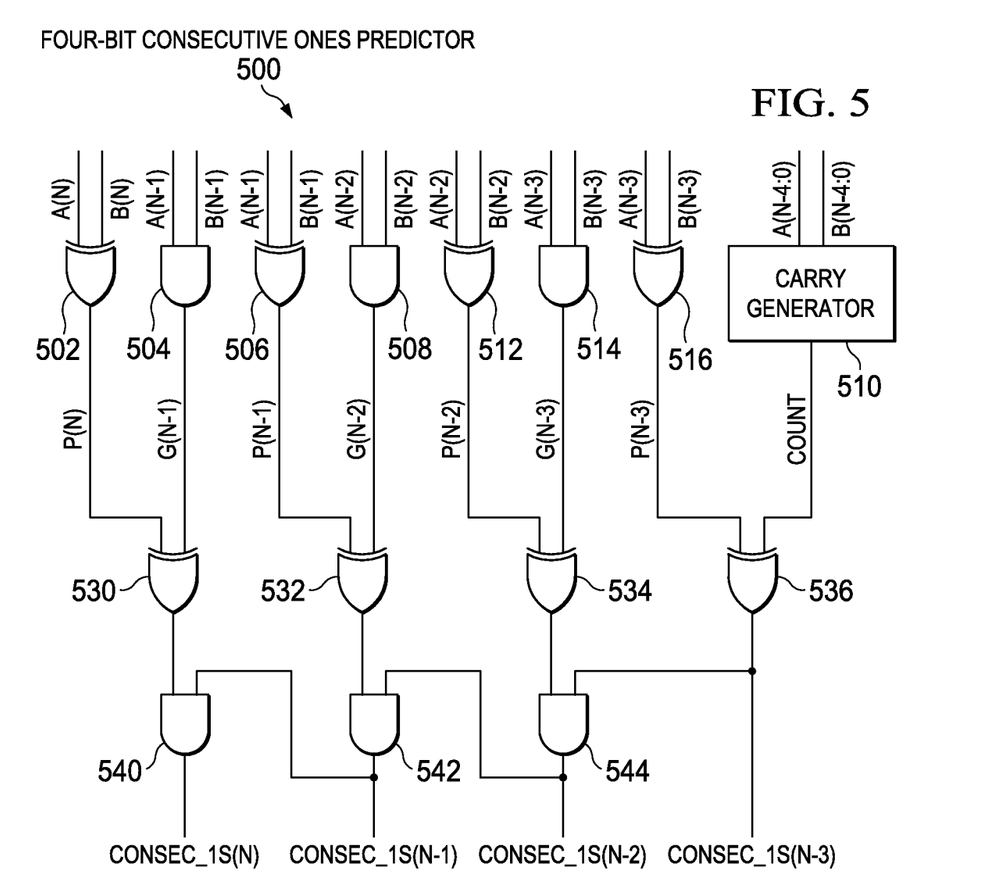
FIG. 5 is a schematic diagram illustrating a four-bit consecutive ones predictor for a predictive adder in accordance with embodiments of the disclosure.

FIG. 5 is a schematic diagram illustrating a four-bit consecutive ones predictor for a predictive adder in accordance with embodiments of the disclosure. Four-bit consecutive ones predictor 500 detects a number k (e.g., k=4) of consecutive ones to "pre-calculate" the effect of adding a $2^k$ constant to the sum of the A+B (without having to produce the final sum before determining the effect of adding the $2^k$ constant).

XOR gate 502 generates the term P(N) and AND gate 504 generates the term G(N−1), which are then input to XOR gate 530 (per equation 7) to predict a pair of consecutive ones for Sum (N) and Sum (N−1). XOR gate 506 generates the term P(N−1) and AND gate 508 generates the term G(N−2), which are then input to XOR gate 532 to predict a pair of consecutive ones for Sum (N−1) and Sum (N−2). XOR gate 512 generates the term P(N−2) and AND gate 514 generates the term G(N−3), which are then input to XOR gate 534 to predict a pair of consecutive ones for Sum (N−2) and Sum (N−3). Thus, adjacent bits are successively paired on an overlapping basis for to predict a pair of consecutive ones.

The outputs of carry generator 510 and XOR gate 516 are provided as inputs to XOR gate 536 to predict a predict a possibility of either, but not both, a propagate bit for Sum (N−3) being generated or a carry out of lesser order bits being generated. As discussed below with reference to FIG. 6, the lowest predicted bit is to be left-shifted with a value of one shifted into the vacant bit position: thus, a positive indication from XOR gate 536 is an indication of consecutive ones at (in this example) at the lowest bit position N−3.

Thus, an indication of consecutive ones at the bits N down to N−3 position of Sum is determined by a series of AND gates arranged in a "thermometer output" (e.g., progressive output) configuration where each output bit of selected bits of the pair of consecutive ones is recursively ANDed with a (compounded) result of such AND operations of lower bits for which propagate and generate bits are determined. As discussed above, the pair of consecutive ones at Sum (N−3) is determined by XOR gate 536.

The output of XOR gate 536 is ANDed (by AND gate 544) with the output of XOR gate 534 to determine an indication of consecutive ones at Sum (N−2). The output of AND gate 544 is ANDed (by AND gate 542) with the output of XOR gate 532 to determine an indication of consecutive ones at Sum (N−1). The output of AND gate 542 is ANDed (by AND gate 540) with the output of XOR gate 530 to determine the (progressive) indication of consecutive ones at Sum (N). Thus, four-bit consecutive ones predictor 500 provides an indication of consecutive ones, starting from the lowest bit (N−3 in this example) where the indication includes the length (e.g., number) of consecutive ones predicted (up to four bits in this example). For simplicity, the logic performed by AND gates 540, 542, and 544 is illustrated as a series of cascaded AND gates. To reduce the propagation delay of the illustrative series of cascaded AND gates in an embodiment, an optimization tool can be used to realize an N-bit input AND-type tree having a depth of log 2(N), which can be used to perform the illustrative logic with less delay.

Figure 6:
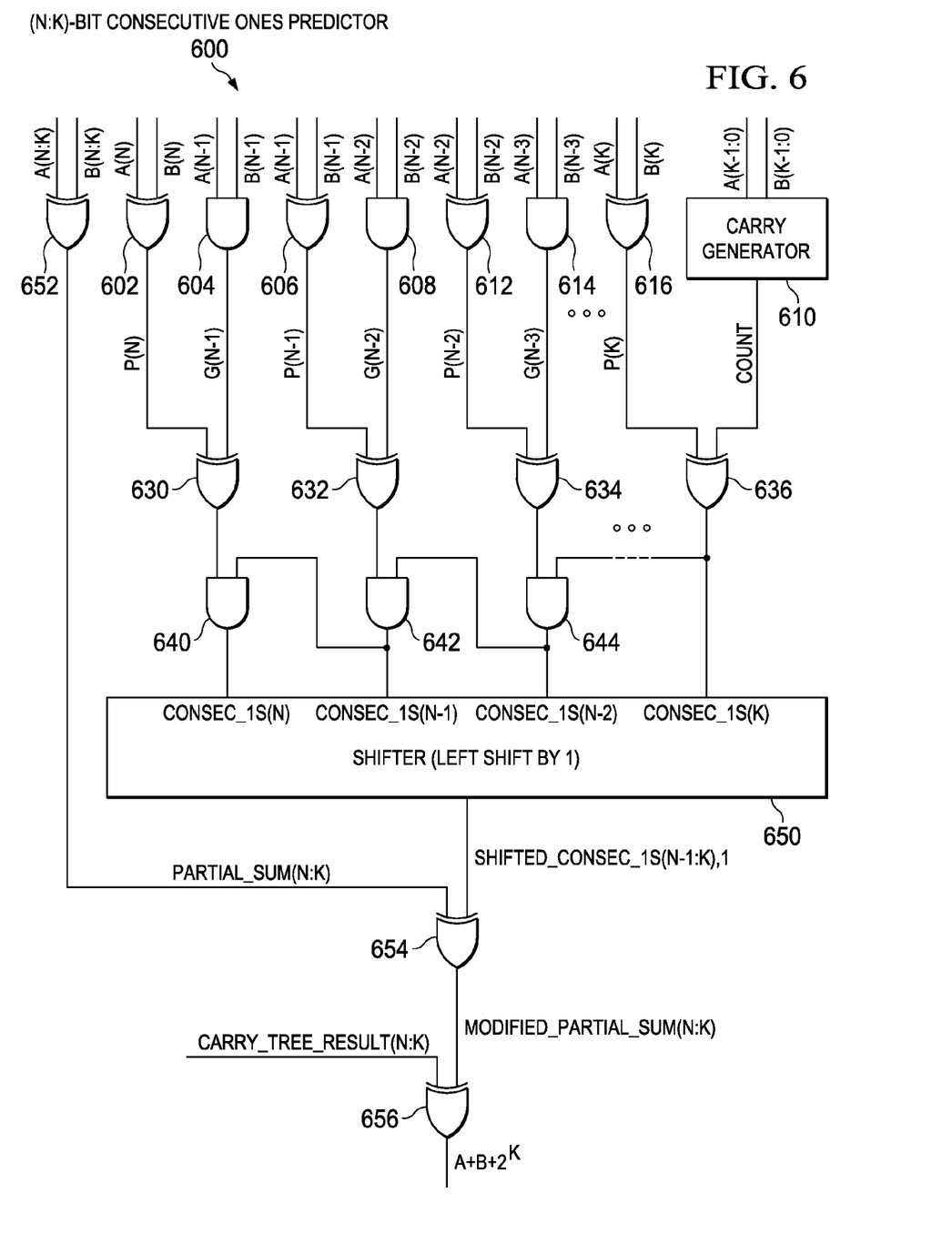
FIG. 6 is a schematic diagram illustrating a generalized consecutive ones predictor for a predictive adder in accordance with embodiments of the disclosure.

FIG. 6 is a schematic diagram illustrating a generalized consecutive ones predictor for a predictive adder in accordance with embodiments of the disclosure. Generalized consecutive ones predictor 600 detects a number k (which is generalized as K in the figure) of consecutive ones to "pre-calculate" the effect of adding a $2^k$ constant to the sum of the A+B (without having to produce the final sum before determining the effect of adding the $2^k$ constant).

XOR gate 602 generates the term P(N) and AND gate 604 generates the term G(N−1), which are then input to XOR gate 630 (per equation 7) to predict a pair of consecutive ones for Sum (N) and Sum (N−1). XOR gate 606 generates the term P(N−1) and AND gate 608 generates the term G(N−2), which are then input to XOR gate 632 to predict a pair of consecutive ones for Sum (N−1) and Sum (N−2). XOR gate 612 generates the term P(N−2) and AND gate 614 generates the term G(N−3), which are then input to XOR gate 634 to predict a pair of consecutive ones for Sum (N−2) and Sum (N−3). Thus, adjacent bits are paired on an overlapping basis to predict a pair of consecutive ones. Prediction of consecutive ones for additional bits can be included by performing equation 7 using each bit with each successively lower bit and including the result of equation 7 in the thermometer output configuration of AND gates (e.g., 640, 642, and 644) as discussed below.

For simplicity, the logic performed by AND gates 640, 642, and 644 (and other gates in the series not explicitly shown) is illustrated as a series of cascaded AND gates. To reduce the propagation delay of the illustrative series of cascaded AND gates in an embodiment, an optimization tool can be used to realize an N-bit input AND-type tree having a depth of log 2(N), which can be used to perform the illustrative logic with less delay.

The outputs of carry generator 610 and XOR gate 616 are provided as inputs to XOR gate 636 to predict a predict a possibility of either, but not both, a propagate bit P(K) for Sum (K) being generated or a carry out of lesser order bits being generated. The lowest predicted bit K is to be left-shifted with a value of one shifted into the vacant bit position: thus, a positive indication from XOR gate 636 is an indication of consecutive ones at (in this example) at the lowest bit position K.

The indication of consecutive ones at the bits N down to K position of Sum is determined by a series of AND gates arranged in a thermometer output configuration. As discussed above, the indication of consecutive ones at Sum (K) is determined by XOR gate 636. The output of XOR gate 636 is ANDed (by AND gate 644) with the output of XOR gate 634 to determine the indication of consecutive ones at Sum (N−2). The output of AND gate 644 is ANDed (by AND gate 642) with the output of XOR gate 632 to determine the indication of consecutive ones at Sum (N−1). The output of AND gate 642 is ANDed (by AND gate 640) with the output of XOR gate 630 to determine the indication of consecutive ones at Sum (N). Thus, consecutive ones predictor 600 provides an indication of consecutive ones, starting from the lowest bit (K) where the indication includes the length (e.g., number) of consecutive ones predicted (up to N bits).

As introduced briefly above, the indication of consecutive ones is left-shifted (from lesser order bits to higher order bits) by shifter 650 with a bit value of one being shifted into the vacant bit in the indication of consecutive ones. The indication of consecutive ones thus describes a ripple portion of the sum of A+B that would be affected (e.g., toggled) by adding the constant $2^k$ at the k bit position of the sum of A+B.

Figure 9:
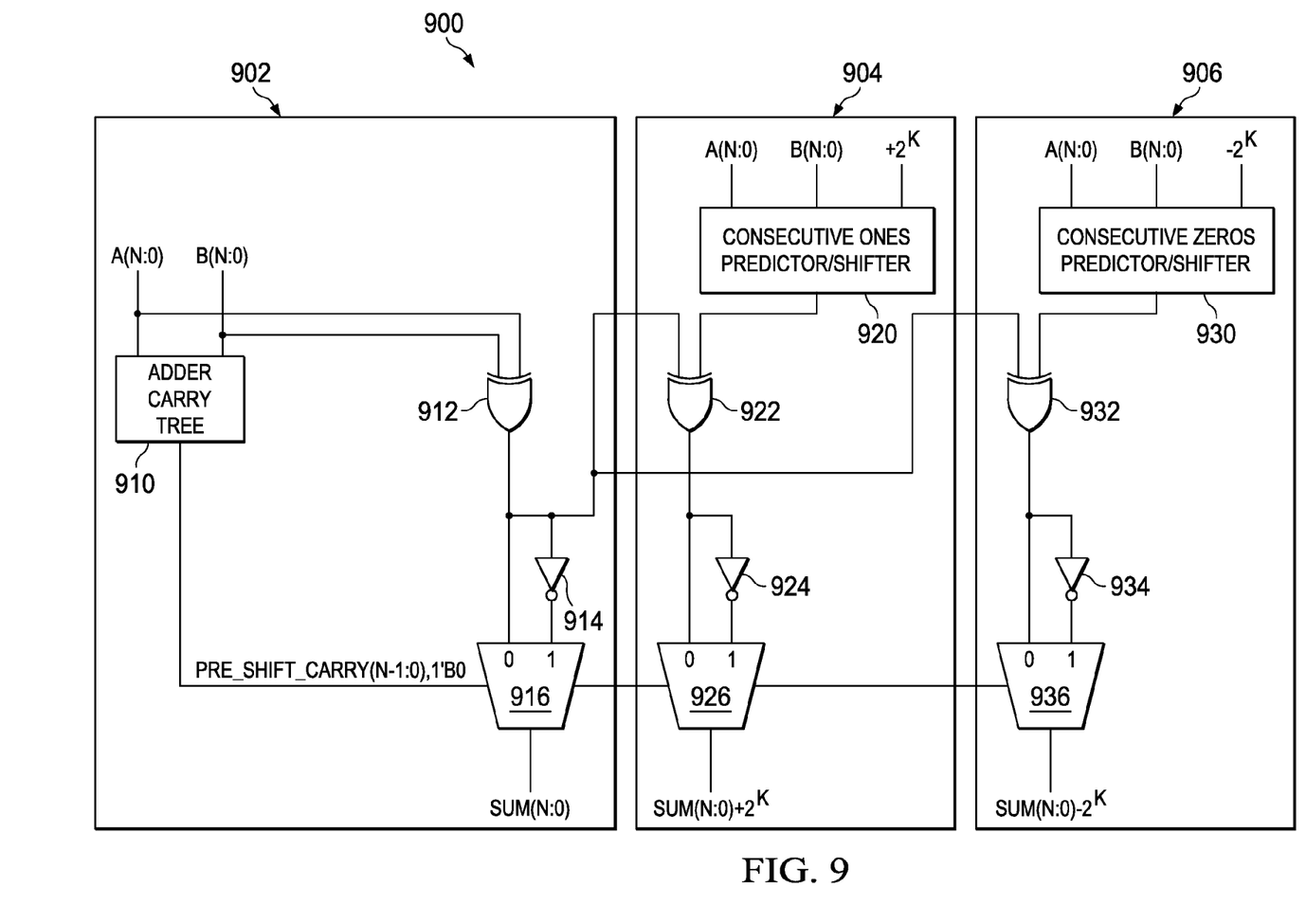
FIG. 9 is a schematic diagram illustrating a three-term predictive adder/subtracter in accordance with embodiments of the disclosure.

To determine the actual result of $A+B+2^k$, a partial sum(N:K) is determined by XORing (XOR gate 652) the A(N:K) with B(N:K). The partial sum (N:K) is XORed (XOR gate 654) with the ripple portion indicated in the output of shifter 650 to generate a modified partial sum(N:K). The modified partial sum (N:K) is XORed (XOR gate 656) with the result produced by the carry-tree (such as adder carry tree 910, discussed below) to produce the actual result of $A+B+2^k$.

Figure 7:
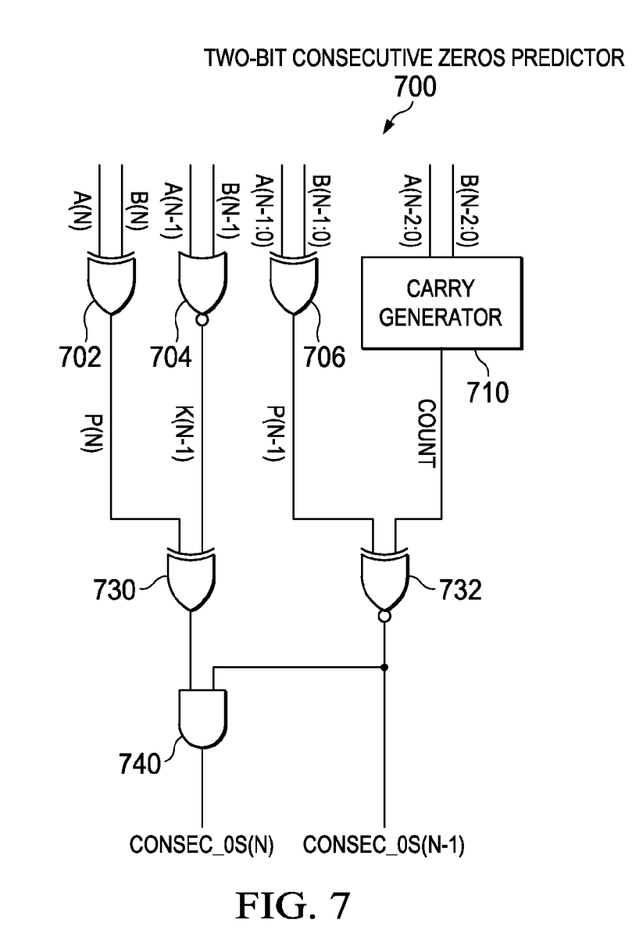
FIG. 7 is a schematic diagram illustrating a two-bit consecutive zeros predictor for a predictive subtracter in accordance with embodiments of the disclosure.

FIG. 7 is a schematic diagram illustrating a two-bit consecutive zeros predictor for a predictive subtracter in accordance with embodiments of the disclosure. Two-bit consecutive zeros predictor 700 detects up to a sequence of two consecutive zeros to "pre-calculate" the effect of subracting a $2^k$ constant from the sum of the A+B operands of an adder (without having to produce the final sum before determining the effect of subtracting the $2^k$ constant). As described below with reference to FIG. 9, the prediction is calculated in parallel to the addition of A and B, and the pre-calculated result of the prediction is combined with the output of the carry tree of the A+B adder to produce $A+B-2^k$. Thus, a single adder is used to calculate all three results without increasing propagation delays over a single adder used to calculate the sum of A+B.

Using the identities expressed in Table 1, the equations used to describe the two-bit consecutive zeros predictor 700 (used in producing the result of $A+B-2^k$) are now discussed. To subtract 2K from the sum of A and B, the two-bit consecutive zeros predictor 700 predicts whether Sum (N) and Sum (N−1) both have the value of zero (e.g., "consecutive" zeros, because N and N−1 are consecutive).

According to Table 1 above, there are three possibilities in which consecutive zeros exist. The first row for Sum(N)=0 indicates P(N)=0 and K(N−1)=1 when Sum(N)=0. Likewise, the second row for Sum(N)=0 indicates P(N)=1 and G(N−1)=1 when Sum(N)=0. Further, the row for Sum(N−1) indicates that P(N)=1 and P(N−1)=1 when Sum(N)=Sum(N−1). Thus, the three possibilities for a pair of consecutive zeros (PCZ) can be expressed as:

PCZ=(P(N) AND G(N−1)) OR (NOT(P(N)) AND K(N−1)) OR (P(N) AND P(N−1))    (8)

Using the associative property of the AND operation:

PCZ=(P(N) AND (G(N−1) OR P(N−1))) OR (NOT(P(N)) AND K(N−1))

Substituting NOT(K(N−1)) for (G(N−1) OR P(N−1)) because NOT(K)=G OR P:

PCZ=(P(N) AND NOT(K(N−1))) OR (NOT(P(N)) AND K(N−1))

Using the identity for an XOR operation:

PCZ=(P(N) XOR K(N−1))    (9)

Accordingly, XOR gate 702 generates the term P(N) and NOR (negated OR) gate 704 generates the term K(N−1), which are then input to XOR (exclusive OR logical operation) gate 730 (per equation 9) to predict a possibility of consecutive zeros for Sum (N) and Sum (N−1). Carry generator 710 generates the carry output based on each of the lesser inputs, which here extend downwards from the N−2 bit down to the zero bit (N−2:0) for both A and B operands. The outputs of carry generator 710 and XOR gate 706 are provided as inputs to NXOR (negated exclusive OR, or equivalence) gate 732 to predict a predict a possibility of either, but not both, a propagate bit for Sum (N−1) being generated or a carry out of lesser order bits being generated.

Thus, the possibility of consecutive zeros at the bit N position of Sum (N) is determined by AND gate 740. As disclosed herein, two-bit consecutive zeros predictor 700 evaluates overlapping pairs of corresponding bits in operands A and B to determine propagate bits (e.g., P(N)) and a kill bit for an adjacent, lower bit (K(N−1)). The terms P(N) and K(N−1) are XORed (XOR gate 730) and then ANDed (AND gate 740) with results of from lower bits, the results being generated from evaluating overlapping pairs of corresponding bits in lower bit position of each operand.

Figure 8:
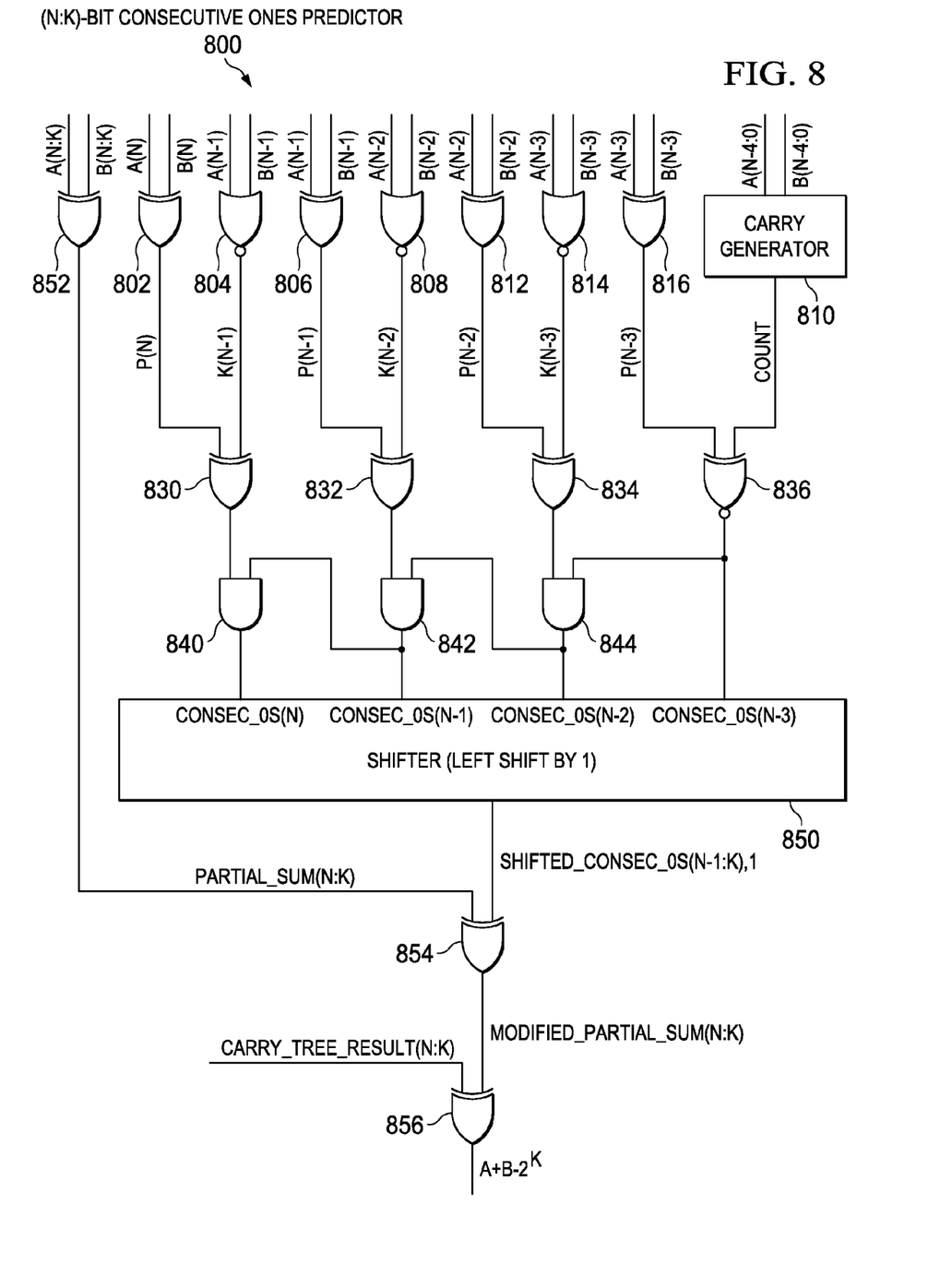
FIG. 8 is a schematic diagram illustrating a generalized consecutive zeros predictor for a predictive subtracter in accordance with embodiments of the disclosure.

FIG. 8 is a schematic diagram illustrating a four-bit consecutive zeros predictor for a predictive adder/subtracter in accordance with embodiments of the disclosure. Four-bit consecutive zeros predictor 800 detects a number k (where k=4) of consecutive zeros to "pre-calculate" the effect of subtracting a $2^k$ constant from the sum of the A+B (without having to produce the final sum before determining the effect of subtracting the $2^k$ constant).

XOR gate 802 generates the term P(N) and NOR gate 804 generates the term K(N−1), which are then input to XOR gate 830 (per equation 9) to predict a possibility of consecutive zeros for Sum (N) and Sum (N−1). XOR gate 806 generates the term P(N−1) and NOR gate 808 generates the term K(N−2), which are then input to XOR gate 832 to predict a possibility of consecutive zeros for Sum (N−1) and Sum (N−2). XOR gate 812 generates the term P(N−2) and NOR gate 814 generates the term K(N−3), which are then input to XOR gate 834 to predict a possibility of consecutive zeros for Sum (N−2) and Sum (N−3). Thus, adjacent bits are paired on an overlapping basis to predict a possibility of consecutive zeros. Prediction of consecutive zeros for additional bits can be included by performing equation 9 using each bit with each successively lower bit and including the result of equation 9 in the thermometer output configuration of AND gates (e.g., 840, 842, and 844) as discussed below.

For simplicity, the logic performed by AND gates 840, 842, and 844 (and other gates in the series not explicitly shown) is illustrated as a series of cascaded AND gates. To reduce the propagation delay of the illustrative series of cascaded AND gates in an embodiment, an optimization tool can be used to realize an N-bit input AND-type tree having a depth of log 2(N), which can be used to perform the illustrative logic with less delay.

The outputs of carry generator 810 and XOR gate 816 are provided as inputs to NXOR gate 836 to predict a predict a possibility of either, but not both, a propagate bit P(N−3) for Sum (N−3) being generated or a carry out of lesser order bits being generated. The lowest predicted bit N−3 is to be left-shifted with a value of one being shifted into the vacant bit position: thus, a positive indication from NXOR gate 836 is an indication of consecutive zeros at (in this example) at the lowest bit position N−3.

The possibility of consecutive zeros at the bits N down to N−3 position of Sum is determined by a series of AND gates arranged in a thermometer output configuration. As discussed above, the possibility of consecutive zeros at Sum (N−3) is determined by NXOR gate 836. The output of NXOR gate 836 is ANDed (by AND gate 844) with the output of XOR gate 834 to determine the possibility of consecutive zeros at Sum (N−2). The output of AND gate 844 is ANDed (by AND gate 842) with the output of XOR gate 832 to determine the possibility of consecutive zeros at Sum (N−1). The output of AND gate 842 is ANDed (by AND gate 840) with the output of XOR gate 830 to determine the possibility of consecutive zeros at Sum (N). Thus, consecutive zeros predictor 800 provides an indication of consecutive zeros, starting from the lowest bit (N−3) where the indication includes the length (e.g., number) of consecutive zeros predicted (up to N bits).

The indication of consecutive zeros is left-shifted (from lesser order bits to higher order bits) by shifter 850 with a bit value of one being shifted into the vacant bit in the indication of consecutive zeros. The indication of consecutive zeros thus describes a ripple portion of the sum of A+B that are predicted to be affected (e.g., toggled) by subtracting the constant $2^k$ from the k bit position of the sum of A+B.

To determine the actual result of A+B−$2^k$, a partial sum(N:K) is determined by XORing (XOR gate 852) the A(N:K) with B(N:K). The partial sum (N:K) is XORed (XOR gate 854) with the ripple portion indicated in the output of shifter 850 to generate a modified partial sum(N:K). The modified partial sum (N:K) is XORed (XOR gate 856) with the result produced by the carry-tree (such as adder carry tree 910, discussed below) to produce the actual result of A+B−$2^k$.

FIG. 9 is a schematic diagram illustrating a three-term predictive adder/subtracter in accordance with embodiments of the disclosure. Adder 900 is a three-input, one-output (3:1) full adder that includes adder 902, predictive incrementer 904, and predictive decrementer 906. Predictive incrementer 904 and predictive decrementer 906 are arranged in parallel with adder 902 and thus respectively produce the results A+B+$2^k$ and A+B−$2^k$ at substantially the same time as adder 902 produces the result of A+B.

Adder 902 is an N-bit adder that includes an adder carry tree 910, XOR gate 912, inverter 316, and multiplexer (MUX) 318. In accordance with equation 1, adder 900 is arranged to produce the sum of A+B. A partial sum result of A+B that is produced by XOR gate 912 is provided as an input to both predictive incrementer 904 and predictive decrementer 906.

Predictive incrementer 904 includes a consecutive ones predictor/shifter 920, XOR gate 922, inverter 924, and multiplexer 926. Consecutive ones predictor/shifter 920 includes a consecutive ones predictor coupled to a left-shifter in an arrangement similar to arrangements described above. In accordance with the present disclosure, predictive incrementer 904 has a relatively low propagation delay in comparison to (at least) a (non-trivial) adder 902. The partial sum result of A+B that is produced by XOR gate 912 is XORed with the output of the predictive incrementer 904 by XOR gate 922. The output of XOR gate 922 is negated by inverter 924 such that the output of XOR gate 922 and its inversion are coupled to multiplexer 926 as inputs.

Predictive decrementer 906 includes a consecutive zeros predictor/shifter 930, XOR gate 932, inverter 934, and multiplexer 936. Consecutive zeros predictor/shifter 930 includes a consecutive zeros predictor coupled to a left-shifter in an arrangement similar to arrangements described above. In accordance with the present disclosure, predictive decrementer 906 has a relatively low propagation delay in comparison to (at least) a non-trivial adder 902 (having, for example, A and B operands of eight bits or more). The partial sum result of A+B that is produced by XOR gate 912 is XORed with the output of the predictive decrementer 906 by XOR gate 932. The output of XOR gate 932 is negated by inverter 934 such that the output of XOR gate 932 and its inversion are coupled to multiplexer 936 as inputs.

One of the latest calculations (if not the last calculation) of adder carry tree 910 produces the pre_shift_carry(N−1:0) signal that is coupled to the control inputs of multiplexers 916, 926 and 936 as inputs. Thus, the output of multiplexer 916 (of adder 902) is available substantially at the same time as the outputs of multiplexers 926 (of predictive incrementer 906) and 936 (of predictive decrementer 906). Accordingly, the results of equations A+B+$2^k$ and A+B−$2^k$ at produced substantially the same time as the time that adder 902 produces the result of A+B.

In various embodiments, a processor (such as CPU 112) can include predictive adders that include (in addition to adder 902) both consecutive ones predictor/shifter 920 and consecutive zeros predictor/shifter 930, one or more consecutive ones predictor/shifters 920 (with differing values of k, for example), one or more consecutive zeros predictor/shifters 930 (with differing values of k, for example), consecutive ones predictor/shifters 920 without consecutive zero predictor/shifters 930, consecutive zero predictor/shifters 930 without consecutive one predictor/shifters 920, and similar combinations.

An embodiment of the invention has removed the 3:2 carry-save adder delays from its critical path which makes the embodiment 10% faster than cascaded adders (such as described above with respect to FIG. 2). The embodiment uses 15% less area and power than paralleled adders (such as described above with respect to FIG. 3) because the embodiment uses only one adder to produce three results, A+B, A+B+$2^k$ and A+B−$2^k$ simultaneously. In processors where the calculations A+B+$2^k$ and A+B−$2^k$ are part of the critical path of the processor, processor cycle times can thus be improved up to 10% over conventional approaches.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:
1. A predictive adder, comprising:
   a full adder that is arranged to add a first operand and a second operand to produce a sum of the first and second operand and to generate a carry output in response to the addition of the first and second operands; and at least one of a consecutive ones predictor and a consecutive zeros predictor, wherein the consecutive ones predictor is arranged to evaluate the first and second operands to generate an indication of a ripple portion of bits in a potential sum of the first and second operands that are predicted to be toggled by incrementing the potential sum of the first and second operands at a bit position determined by k, where k determines a one-bit constant of the form $2^k$, and that is arranged to produce the sum of the first and second operands and the one-bit constant in response to the indication of the ripple portion of bits in the potential sum of the first and second operands and the carry output generated by the full adder, and wherein the consecutive zeros predictor is arranged to evaluate the first and second operands to generate an indication of a ripple portion of bits in the potential sum of the first and second operands that are predicted to be toggled by incrementing the potential sum of the first and second operands at a bit position determined by k, where k determines a one-bit constant of the form $2^k$, and that is arranged to produce the sum of the first and second operands with the one-bit constant subtracted therefrom in response to the indication of the ripple portion of bits in the potential sum of the first and second operands and the carry output generated by the full adder.

2. The predictive adder of claim 1, wherein the at least one of the consecutive ones predictor and the consecutive zeros predictor are configured to produce the indication of a ripple portion of bits in the potential sum of the first and second operands before the carry output is generated by the full adder.

3. The predictive adder of claim 1, wherein the predictive adder includes both the consecutive ones predictor and the consecutive zeros predictor.

4. The predictive adder of claim 3, wherein the ripple portion of bits includes consecutive ones in the consecutive ones predictor, and wherein the ripple portion of bits includes consecutive zeros in the consecutive zeros predictor.

5. The predictive adder of claim 1, wherein the consecutive ones predictor and the consecutive zeros predictor left-shift the ripple portion by one bit position to respectively generate the indication of consecutive ones and consecutive zeros.

6. The predictive adder of claim 1, wherein the consecutive ones predictor is arranged to generate the indication of consecutive ones in response to determining propagate and generate bits for the first and second operands, and wherein the consecutive zeros predictor is arranged to generate the indication of consecutive ones in response to determining propagate and kill bits for the first and second operands.

7. The predictive adder of claim 6, wherein the consecutive ones predictor is arranged to determine the propagate bits by performing a bitwise logical exclusive OR (XOR) operation between selected pairs of bits of the first and second operands and to determine the generate bits by performing a bitwise logical AND operation between selected pairs of bits of the first and second operands, and wherein the consecutive zeros predictor is arranged to determine the propagate bits by performing a bitwise logical exclusive OR operation between selected pairs of bits of the first and second operands and to determine the kill bits by performing a bitwise logical NOR operation between selected pairs of bits of the first and second operands.

8. The predictive adder of claim 1, wherein the consecutive ones predictor is arranged to perform a bitwise logical exclusive OR (XOR) operation using the first and second operands to generate a consecutive ones partial sum, and wherein the consecutive zeros predictor is arranged to perform a bitwise logical XOR operation using the first and second operands to generate a consecutive zeros partial sum.

9. The predictive adder of claim 8, wherein the consecutive ones partial sum is bitwise logical XORed with the indication of a ripple portion of bits in a potential sum of the first and second operand to generate a consecutive ones modified partial sum, and wherein the consecutive zeros partial sum is bitwise logical XORed with the indication of a ripple portion of bits in a potential sum of the first and second operand to generate a consecutive zeros modified partial sum.

10. The predictive adder of claim 9, wherein the consecutive ones partial sum is bitwise logical XORed with the carry output to produce the sum of the first and second operands and the one-bit constant, and wherein the consecutive zeros partial sum is bitwise logical XORed with the carry output to produce the sum of the first and second operands with the one-bit constant subtracted therefrom.

11. A digital system, comprising:
a memory for storing and retrieving data;
a processor that is arranged to access the memory to store and retrieve the data and wherein the processor includes a full adder that is arranged to generate addresses for storing and retrieving the data in the memory by receiving a first operand A and a second operand B to produce a sum A+B and to generate a carry output in response to producing the sum of A+B, and wherein the processor includes a consecutive digits predictor that is arranged to evaluate the first operand A and second operand B to generate an indication of a ripple portion of consecutive bits in a potential sum of the first operand A and second operand B that are predicted to be toggled by respectively incrementing or decrementing the potential sum at a bit position determined by k, where k determines a one-bit constant of the form $2^k$, and wherein the processor is arranged to respectively evaluate $A+B+2^k$ or $A+B-2^k$ in response to the indication of the ripple portion of bits in the potential sum of the first operand A, the second operand B, and the carry output generated by the full adder.

12. The system of claim 11, wherein the indication of a ripple portion of consecutive bits in a potential sum of the first operand A and second operand B is a string of consecutive ones.

13. The system of claim 11, wherein the indication of a ripple portion of consecutive bits in a potential sum of the first operand A and second operand B is generated by determining propagate and generate bits for the first and second operands.

14. The system of claim 11, wherein the indication of a ripple portion of consecutive bits in a potential sum of the first operand A and second operand B is a string of consecutive zeros.

15. The system of claim 11, wherein the indication of a ripple portion of consecutive bits in a potential sum of the first operand A and second operand B is generated by determining propagate and kill bits for the first and second operands.

16. The system of claim 11, wherein the processor is arranged to respectively evaluate both $A+B+2^k$ and $A+B-2^k$ in response to the indication of the ripple portion of bits in the potential sum of the first operand A, the second operand B, and the carry output generated by the full adder.

* * * * *